United States Patent
Oommen (10) Patent No.: US 8,065,359 B2
(45) Date of Patent: Nov. 22, 2011

(54) INTEGRATED METHOD AND APPARATUS TO MANAGE MOBILE DEVICES AND SERVICES

(75) Inventor: Paul Oommen, Irving, TX (US)

(73) Assignee: Nokia Corporation, Espoo (FI)

( * ) Notice: Subject to any disclaimer, the term of this patent is extended or adjusted under 35 U.S.C. 154(b) by 1081 days.

(21) Appl. No.: 11/062,180

(22) Filed: Feb. 18, 2005

(65) Prior Publication Data

US 2006/0069743 A1    Mar. 30, 2006

Related U.S. Application Data

(60) Provisional application No. 60/610,730, filed on Sep. 16, 2004.

(51) Int. Cl.
*G06F 15/16* (2006.01)
(52) U.S. Cl. .......................... 709/203; 709/217
(58) Field of Classification Search .............. 709/203, 709/217
See application file for complete search history.

(56) References Cited

U.S. PATENT DOCUMENTS

| | | | |
|---|---|---|---|
| 6,144,849 A * | 11/2000 | Nodoushani et al. .......... | 455/419 |
| 6,684,121 B1 * | 1/2004 | Lu et al. ........................ | 700/108 |
| 6,691,281 B1 * | 2/2004 | Sorge et al. .................... | 715/234 |
| 6,725,056 B1 * | 4/2004 | Moles et al. ................... | 455/524 |
| 7,003,571 B1 * | 2/2006 | Zombek et al. ................ | 709/227 |
| 7,013,289 B2 * | 3/2006 | Horn et al. .................... | 705/26 |
| 2001/0047358 A1 * | 11/2001 | Flinn et al. ..................... | 707/100 |
| 2002/0078092 A1 * | 6/2002 | Kim ............................... | 707/513 |
| 2002/0174240 A1 * | 11/2002 | Nason et al. ................... | 709/230 |
| 2003/0012159 A1 * | 1/2003 | Vassilovski et al. ........... | 370/335 |
| 2003/0012177 A1 * | 1/2003 | Vassilovski .................... | 370/349 |
| 2003/0043185 A1 * | 3/2003 | Kake et al. ..................... | 345/738 |
| 2003/0103484 A1 * | 6/2003 | Oommen et al. .............. | 370/338 |
| 2003/0174670 A1 * | 9/2003 | Mar et al. ....................... | 370/328 |
| 2003/0225883 A1 * | 12/2003 | Greaves et al. ................ | 709/224 |
| 2003/0227939 A1 * | 12/2003 | Yukie et al. .................... | 370/465 |

(Continued)

FOREIGN PATENT DOCUMENTS

CA    2 339 320    3/2001

(Continued)

OTHER PUBLICATIONS

S. Hollenbeck. RFC 3470. 2003. IETF. pp. 1-28.*

(Continued)

*Primary Examiner* — John Follansbee
*Assistant Examiner* — Imad Hussain
(74) *Attorney, Agent, or Firm* — Ditthavong Mori & Steiner, P.C.

(57) ABSTRACT

Disclosed herein is a method, a system, a network node and a computer program executable by a data processor or data processors to accommodate a non-IP OTA protocol using an end-to-end IP protocol. The method includes receiving a message from a non-IP entity; using a markup language, such as XML, for message and content representation, where in an XML message non-IP protocol content is identified using an XML 'Meta' element, where the Meta element describes the content type as 'non-IP protocol name' and sending the XML message. The step of using XML preferably includes encapsulating received content in an XML message and using the XML Meta element to enable a receiver of the XML message to extract the content. The message received from the non-IP entity may be an IS-683 message.

51 Claims, 4 Drawing Sheets

U.S. PATENT DOCUMENTS

| | | | |
|---|---|---|---|
| 2004/0128280 A1* | 7/2004 | Gomi et al. | 707/1 |
| 2004/0259553 A1* | 12/2004 | Delaney et al. | 455/445 |
| 2004/0260831 A1* | 12/2004 | Dyck et al. | 709/233 |
| 2005/0071423 A1* | 3/2005 | Rajaniemi | 709/203 |
| 2005/0111457 A1* | 5/2005 | Kumar et al. | 370/395.1 |
| 2005/0220041 A1* | 10/2005 | Lin | 370/278 |
| 2005/0256964 A1* | 11/2005 | Dube | 709/230 |
| 2005/0278620 A1* | 12/2005 | Baldwin et al. | 715/513 |

FOREIGN PATENT DOCUMENTS

| | | |
|---|---|---|
| JP | 2003-111035 | 4/2003 |
| KR | 20040007082 | 1/2004 |
| KR | 20040036771 | 5/2004 |
| KR | 10-0896942 B1 | 5/2009 |
| WO | WO-01/63874 A2 | 8/2001 |
| WO | WO 03/049381 A1 | 6/2003 |
| WO | WO 2004/023233 A2 | 3/2004 |

OTHER PUBLICATIONS van Thanh et al. Future Management of Mobile Phones. Mar. 2005. pp. 143-154 (1-12).*

Oommen, Paul and Santhiveeran, Soma. IOTA Device Management for cdma2000 Systems. Apr. 22, 2004. 3GPP2. Version 1.0. pp. 1-15 (title-13).*

Ericsson, IBM, Lotus, Matsushita Communications Industrial Co., Ltd, Motorola, Nokia, Palm, Inc., Psion, Starfish Software. SyncML Meta-Information DTD, version 1.0.1. Jun. 15, 2001. pp. 1-18.*

Oommen, Paul et al.: "IP Based Over-the-Air Device Management (IOTA-DM) for cdma2000 Systems" Jun. 8, 2004, www.3gpp2.org, pp. 15-26.

Oommen, Paul et al.: "IP Based Over-the-Air Device Management (IOTA-DM) for cdma2000 Systems" Sep. 20, 2004, www.3gpp2.org, Chapter 7.

"Over the Air Settings Specification", Approved version: 6.5, Dec. 5, 2000, Doc. No. DSS00234-EN, © 2000 Ericsson, Nokia Mobile Phones, 24 pgs.

"How to Create Internet Access Configuration Messages for the Nokia 9210 Communicator", © 2001, Nokia Mobile Phones, 10 pgs.

"Example of a WAP OTA Service Settings Message", Version 1.1, Jun. 5, 2001, © 2001, Forum Nokia, 15 pgs.

"Over the Air Settings Specification", Approved version: 7.0 Sep. 12, 2001, Doc. No. DSS00234-EN, © 2000, Ericsson, Nokia Mobile Phones, 40 pgs.

"OTA MMS Settings", Version 1.0, Nov. 22, 2002, © 2002, Nokia Mobile Phones.

"Messaging Characteristics in Nokia GSM Devices", Version 1.1: Nov. 2, 2004, Forum Nokia, 21 pgs.

Chinese Office Action for corresponding CN Application No. 200580035952.6, Sep. 4, 2009, China.

Japanese Office Action for corresponding JP Application No. 2007-531850, Sep. 24, 2009, Japan.

Kubono, N. "MetNet: Information Organizer from distributed document meta data with dynamic modeling using XML", IEICE technical report, DE2000-23, Jul. 19, 2000 (English abstract included, Corr. to Cite No. 3). pp. 1-10.

Office Action for the corresponding Japanese Application 2007-531850 dated Jan. 18, 2010. English translation for the relevant portions included. pp. 1-7.

Office Action for the corresponding Mexican Application MX/a/2007/003074 dated Jan. 25, 2010. English Translation of the relevant portions included. pp. 1-3.

Office Action for the corresponding Mexican Application MX/a/2007/003074 dated Oct. 23, 2009. English Translation of the relevant portions included. pp 1-3.

Canadian Office action for corresponding CA Application No. 2,580,340 Jul. 16, 2010, pp. 1-4.

Canadian Office action for corresponding CA Application No. 2,580,340 May 8, 2009, pp. 1-4.

Chinese Office Action for corresponding CN Application No. 200580035952.6, Aug. 3, 2010, pp. 1-10.

* cited by examiner

```
<Meta>
    <Type xmlns='syncmlns'>syncmlns: cdma- is683</Type>
    <Format xmlns='syncmlns'> ... </Format>
    <Target><LocURI>./cdma/is683</LocURI></Target>
    <Data>IS-683 Message content</Data>
</Meta>
```

FIG.4

INTEGRATED METHOD AND APPARATUS TO MANAGE MOBILE DEVICES AND SERVICES

CLAIM OF PRIORITY FROM COPENDING PROVISIONAL PATENT APPLICATION

This patent application claims priority under 35 U.S.C. §119(e) from Provisional Patent Application No. 60/610,730, filed Sep. 16, 2004, the disclosure of which is incorporated by reference herein in its entirety.

TECHNICAL FIELD

The presently preferred embodiments of this invention relate generally to wireless communications systems and methods and, more specifically, relate to over-the-air (OTA) device management procedures for delivering information to a mobile device such as, but not limited to, a cellular telephone.

BACKGROUND

As the functionality of mobile devices grows at an increasing rate, configuring and maintaining the services and features on the mobile devices becomes a complex and time-consuming task. For instance, enabling Wireless Application Protocol (WAP), CDMA, and data connectivity requires the configuration of multiple settings. Even with the limited features that are currently available, some users do not know how to configure their mobile devices.

Another use case is OTA provisioning and management of new services to mobile devices. Advanced mobile services such as browsing, multimedia messaging, mobile e-mail and calendar synchronization require accurate mobile device settings. The process of remotely managing device settings and applications is referred to as Device Management.

OTA management is defined in the 3GPP2 OTASP/OTAPA, OMA (Open Mobile Alliance) Device Management (OMA DM), and 3GPP2 IOTA-DM standards (IOTA-DM stands for "IP based over-the-air device management").

There are also currently non-Internet Protocol-based techniques for remotely managing mobile devices. For example, the IS-683 standard (TIA/EIA-683-C, Over-the-Air Service Provisioning of Mobile Stations in Spread Spectrum Systems, March, 2003) defines a protocol that employs air-interface signaling for remotely managing mobile stations. Another example of the use of non-IP protocols includes the use of proprietary Short Message Service (SMS) based protocols.

Device Management is intended to aid the widespread adoption of mobile services, as it provides a mechanism for users to easily subscribe to new services. For network operators this enables a fast and easy way to introduce new services and manage provisioned services, by dynamically adjusting to changes and ensuring a certain level of quality of service.

In June 2003 the OMA released the OMA Device Management (OMA DM) version 1.1.2 standard based on SyncML DM (Synchronization markup language device management). Reference in this regard may be had to: OMA SyncML HTTP Binding, Version 1.1.2, OMA, Jun. 12, 2003; OMA SyncML OBEX Binding, version 1.1.2, OMA, Jun. 12, 2003; OMA SyncML Device Management Protocol, version 1.1.2, OMA, Jun. 12, 2003. http://www.openmobilealliance.org/release_program/enabler_releases.html; OMA SyncML Representation Protocol, Device Management usage, version 1.1.2, OMA, Jun. 12, 2003; OMA SyncML Device Management Bootstrap, version 1.1.2, OMA, Jun. 12, 2003; OMA SyncML DM DDF DTD (SyncML_dm_ddf_v111_20021002.dtd), version 1.1.2, OMA, Jun. 12, 2003; OMA SyncML Device Management Tree and Descriptions, version 1.1.2, OMA, Jun. 12, 2003; OMA SyncML Device Management Notification Initiated Session, version 1.1.2, OMA, Jun. 12, 2003; OMA SyncML Device Management Security, version 1.1.2, OMA, Jun. 12, 2003; and OMA SyncML WSP Binding, version 1.1.1, OMA, Jun. 12, 2003.

OMA DM provides an integrated and extensible framework for the OTA management needs of 3G mobile devices and beyond. The standard includes the OMA DM protocol specification, which is based on the SyncML DM protocol. The protocol is optimized for OTA management, wherein a basic consideration is related to the resource and bandwidth limitations of mobile devices.

OMA DM, as a mechanism, is very versatile and can be used to manage different types of data objects. Some of the data objects are simple numeric or textual parameters, while others are binary in nature. Numeric objects may include connectivity parameters, such as access point addresses and proxy configurations. Binary objects may include security keys, blocks of data or software modules.

The protocol leverages the WAP 2.0 bootstrap for initial provisioning, and the set of DM protocol specifications for continuous management after the initial provisioning.

Currently, there is no unified way of managing mobile services over-the-air. What is needed, but was not available prior to this invention, is an integrated method for network service providers to manage mobile devices and services using a single mechanism. The currently available different standards for OTA management, such as OMA DM, IOTA-HCM, IS-683, proprietary OTA, OTA Teleservices, and so forth, do not fulfill this need in a satisfactory manner.

SUMMARY OF THE PREFERRED EMBODIMENTS

The foregoing and other problems are overcome, and other advantages are realized, in accordance with the presently preferred embodiments of this invention.

Disclosed is a method, a system and a computer program executable by a data processor or data processors to accommodate a non-IP OTA protocol using an end-to-end IP protocol. The method includes receiving a message from a non-IP entity; using markup language for message and content representation, where in a markup language message non-IP protocol content is identified using a 'Meta' element, where the Meta element describes the content type as 'non-IP protocol name', and sending the markup language message. The step of using the markup language preferably includes encapsulating received content in the markup language message and using the Meta element to enable a receiver of the markup language message to extract the content. The message received from the non-IP entity may be, as a non-limiting example, an IS-683 message.

An aspect of this invention is a network node operable to accommodate a non-IP OTA protocol using an end-to-end IP protocol. The network node includes a receiver to receive a message that contains non-IP protocol content and a processor operable with a markup language, such as XML, for message and content representation to encapsulate in an XML message the non-IP protocol content that is identified to a potential receiver of the XML message as such using an XML 'Meta' element. The Meta element describes the Meta content type as 'non-IP protocol name'. The network node further includes a transmitter to transmit the XML message containing the non-IP protocol content towards a recipient, and via a wireless network.

A further aspect of this invention is a mobile station having a non-IP client and a receiver to receive a markup language message that contains a non-IP protocol content message using an end-to-end IP protocol. The mobile station further includes a processor operable with the markup language for message and content representation to extract the non-IP based content message from the received message in response to a presence of a 'Meta' element that describes the Meta content type as 'non-IP protocol name'.

A still further aspect of this invention is a network node operable to accommodate a non-IP Over-the-Air (OTA) protocol using an end-to-end IP protocol. The network node comprises receiver means for receiving a message that contains non-IP protocol content, where the receiver means is coupled to data processor means operable with a markup language, such as Extensible Markup Language (XML), for message and content representation for encapsulating in an XML message the non-IP protocol content that is identified to a potential receiver of the XML message as such using an XML 'Meta' element. The Meta element describes the Meta content type as 'non-IP protocol name'. The network node further includes transmitter means coupled to the data processor means for transmitting the XML message containing the non-IP protocol content towards a recipient, and via a wireless network.

A still further aspect of this invention provides a method for accommodating a non-IP Over-the-Air (OTA) protocol using an end-to-end IP protocol, and includes a step for receiving a message from a non-IP entity; a step for using markup language for message and content representation, where in a message non-IP protocol content is identified using an 'Meta' element, where the Meta element describes the content type as 'non-IP protocol name'; and a step for sending the message with the "Meta" element.

BRIEF DESCRIPTION OF THE DRAWINGS

The foregoing and other aspects of the presently preferred embodiments of this invention are made more evident in the following Detailed Description of the Preferred Embodiments, when read in conjunction with the attached Drawing Figures, wherein.

DETAILED DESCRIPTION OF THE PREFERRED EMBODIMENTS

By way of introduction, the embodiments of this invention can be used to integrate different OTA protocols, resulting in a unified method for managing mobile devices and services. More specifically, the embodiments of this invention enable the handling of non-Internet Protocol (non-IP) management protocols using an IP-based protocol.

The embodiments of this invention enable the use of an IP-based protocol to achieve an integrated approach for OTA management in different networks and with heterogeneous mobile devices in such networks. The use of the preferred embodiments of this invention ensures that wireless service providers have at their disposal a unified mechanism to manage the mobile devices and services offered in their network(s) or service domain.

The preferred embodiments of this invention use a special Meta type, as well as a specific way of using the DM protocol, to achieve backward compatibility with non-IP protocols used in legacy systems. This enables the markup language-based (i.e., the XML-based) DM protocol to be used in different networks for managing mobile devices of varying features.

The use of the preferred embodiments of this invention may result in cost savings through the re-use of existing components of legacy mobile systems.

The use of the preferred embodiments of this invention also provides an integrated method for service providers to manage mobile services offered in a service domain, and aids in integrating legacy features, as well as third generation (3G) features and future generation features.

The preferred embodiments of this invention can be implemented in mobile devices. Existing software components can be reused to develop an integrated entity in the mobile device to support legacy features. New features for 3G and future generations can then be integrated. Thus, the preferred embodiments of this invention support both legacy features and new features, offering an integrated mechanism to accommodate both. For CDMA mobile devices, the OTASP/OTAPA components can be reused.

Figure 1:
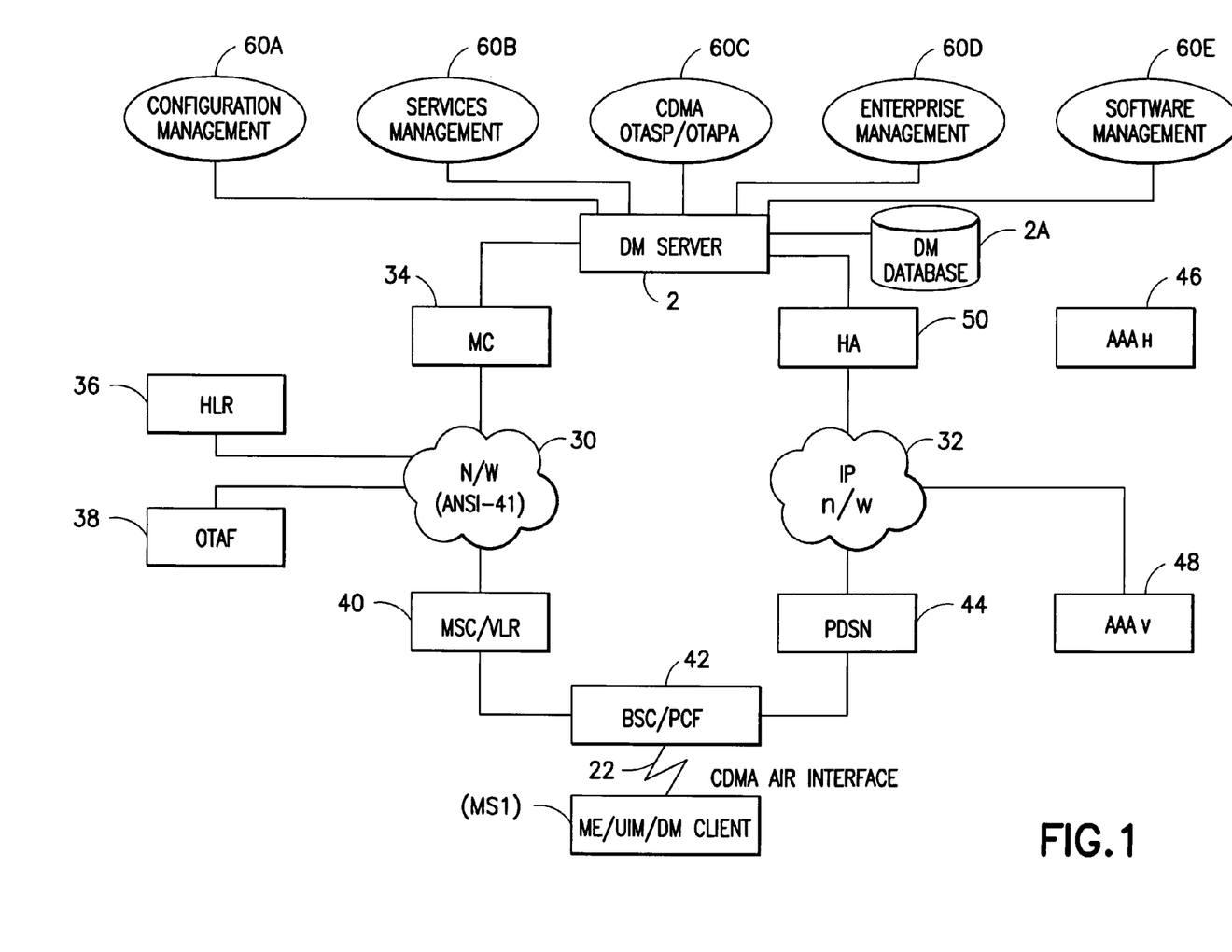
FIG. 1 is simplified block diagram of a CDMA-based DM network architecture.
Figure 2:
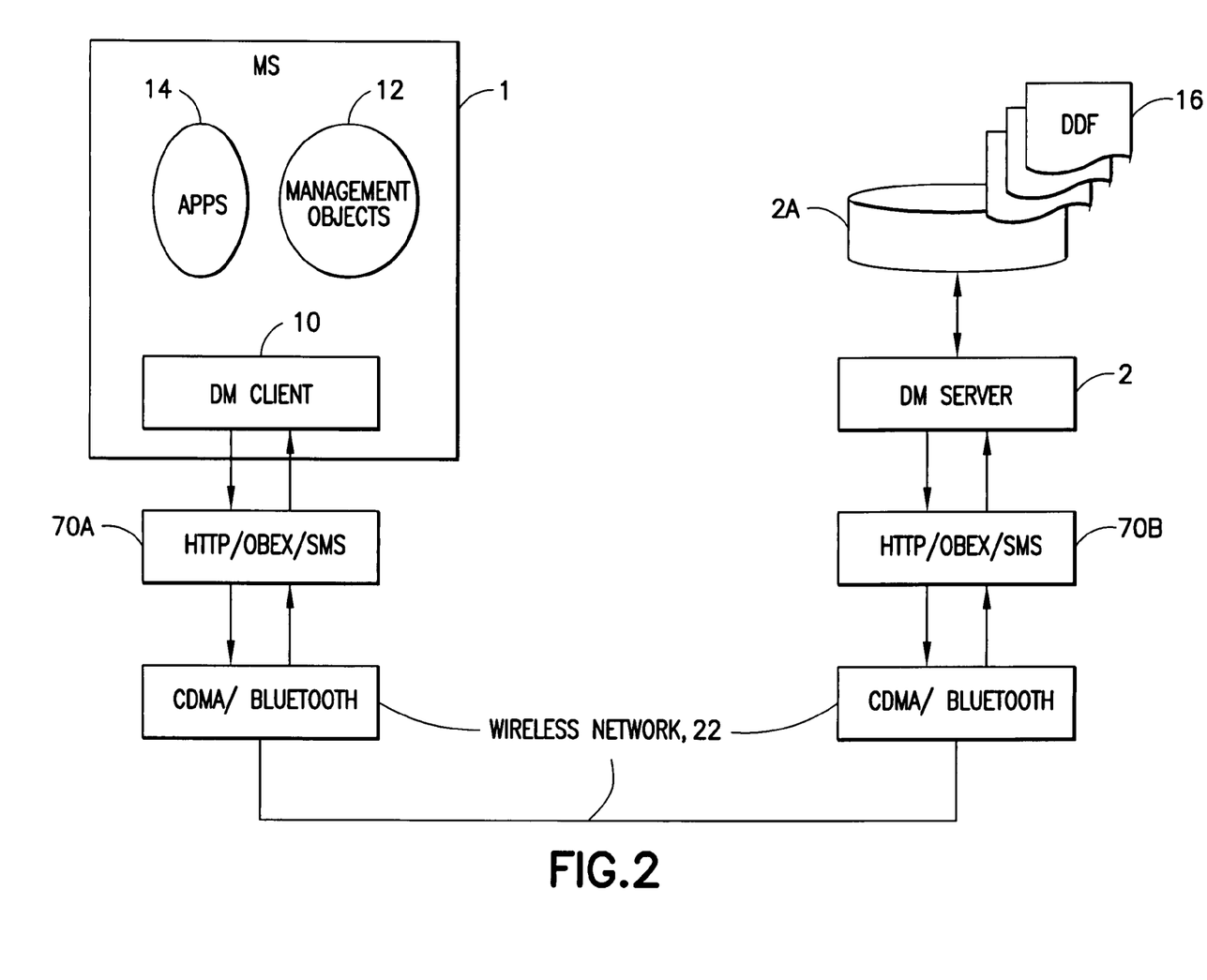
FIG. 2 shows an end-to-end architecture for IOTA-DM.

To place the embodiments of this invention in a proper technological context, reference is made to FIG. 1 for showing a network architecture for DM in an exemplary CDMA network. Though only the CDMA interface is shown, the OMA DM specifications support as well DM over local access technologies, such as low power RF (e.g., Bluetooth™) and infrared (e.g., IrDA). Reference is also made to FIG. 2 for showing the end-to-end architecture for IOTA-DM, and includes a mobile station (MS) 1, such as a cellular telephone, also referred to as a mobile equipment (ME), and a DM server 2 coupled to the MS 1 via a wireless network 22, such as a cellular (e.g., a CDMA) wireless network.

In general, the various embodiments of the MS 1 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. Non-portable devices are also within the scope of these teachings.

In these figures the MS 1 is assumed to include a DM Client 10 that processes the DM messages and commands, performs authorization, and handles access to a DM management tree. Management Objects 12 include parameters, software objects, configuration data blocks and so forth that are associated with applications and services. Management Objects 12 are organized as logically related groups (or subtrees) in a hierarchical tree. The MS 1 is also assumed to include Applications 14.

The DM Server 2 is an entity in the network for managing the services and applications in the MS 1. The DM Server 2 issues DM commands and correctly interprets responses from the DM client 10. The DM Server 2 includes a DM database 2A in which are stored Device Description Framework (DDF) 16 documents. The DDF 16 document is, in the preferred but non-limiting embodiments of this invention, an XML document (Extensible Markup Language (XML) 1.0 (Second Edition), W3C Recommendation, Version 6-Oct.-2000, World Wide Web Consortium) which describes the properties of management objects in the device.

The OMA DM Protocol (OMA SyncML Device Management Protocol, version 1.1.2, OMA, Jun. 12, 2003) defines a management framework and a set of messages exchanged between the MS 1 and the network entity referred to as the DM server 2.

Also shown for completeness in FIG. 1 are various networks (N/W), including by example an ANSI-41 network 30 and an Internet Protocol (IP) network 32. Coupled to the ANSI-41 network 30 is a messaging center (MC) 34, a home location register (HLR) 36, an over-the-air function (OATF) 38 and a mobile switching center/visitor location register pair (MSC/VLR) 40. The MC 34 is coupled to the DM server 2, while the MSC/VLR 40 is coupled to a base station controller/packet control function (BSC/PCF) 42, as is a packet data support node (PDSN) 44 that is associated with the IP network 32. Also associated with the IP network 32 are various Authentication, Authorization and Accounting (AAA) functions 46, 48, and a home agent (HA) 50. The HA 50 couples the IP network 32 to the DM server 2. Above the DM server 2 are shown a plurality of exemplary management functions 60, including Configuration Management 60A, Service Management 60B, CDMA OTA Service Provisioning (OTASP) and OTA Parameter Administration (OTAPA) Management 60C, Enterprise Management 60D and Software Management 60E functions.

Also shown in FIG. 2, interposed between MS 1 and wireless network 22, and between the DM server 2 and the wireless network 22, is a suitable Hyper Text Transfer Protocol (HTTP), Object Exchange Protocol (OBEX) and Short Message Service (SMS) interface 70A and 70B, respectively.

An aspect of this invention relates to the handling of non-IP management protocols using IP-based protocols. In a non-limiting example the non-IP management protocols are described in the content of IS-683 messages (IS-683 is a TIA/EIA and 3GPP protocol for OTA provisioning and OTA parameter administration in the in cdma2000 systems, also known as C.S0016 in 3GPP).

Figure 3:
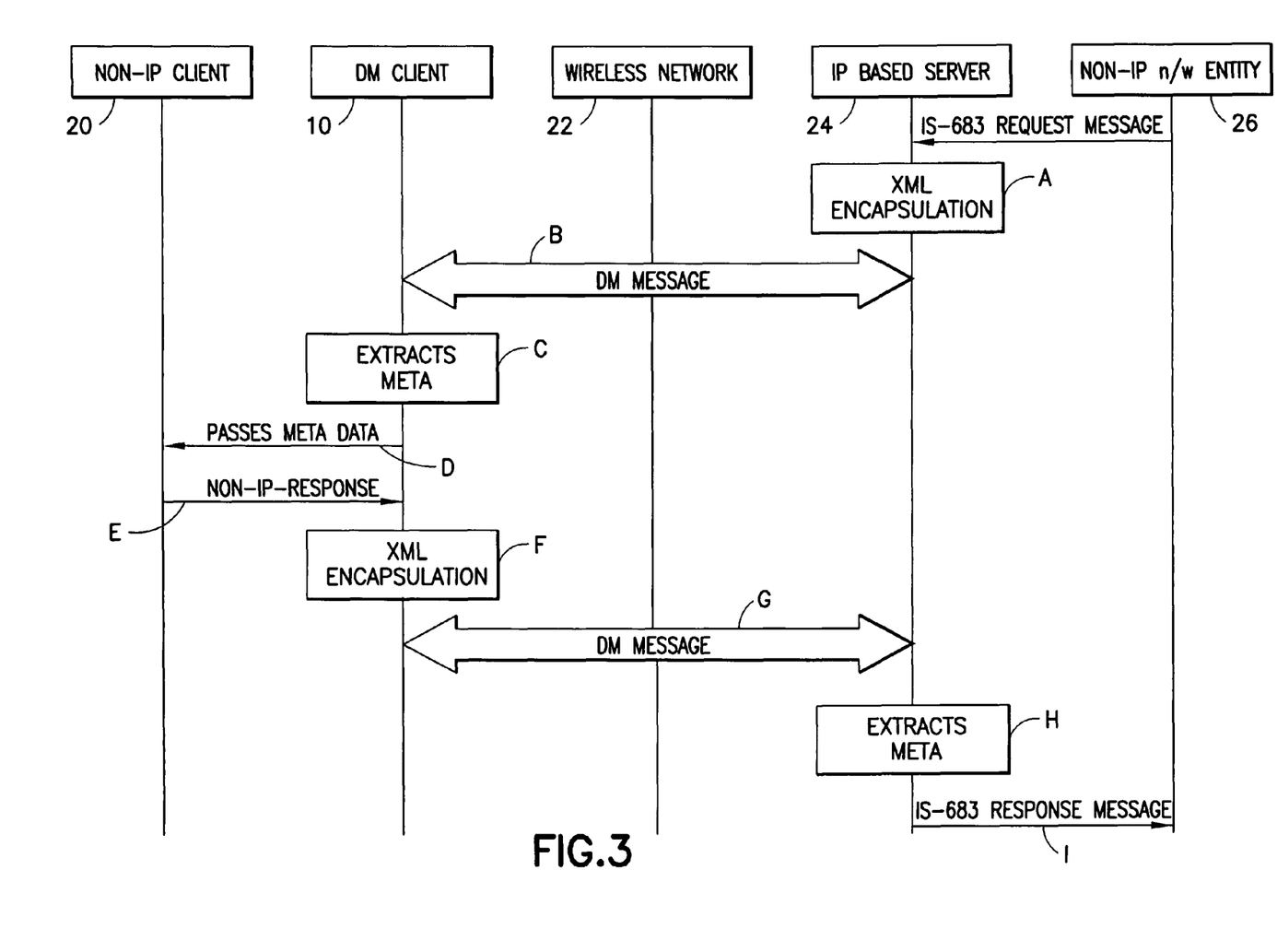
FIG. 3 shows message flow for accommodating an exemplary non_IP DM message, in this non-limiting case an IS-683 DM message.

FIG. 3 shows the message flow between at least one non-IP client 20, the DM client 10, the wireless network 22 (e.g., a CDMA network or a Bluetooth™ network), an IP-based server 24 and at least one non-IP network entity 26, when handling a typical IS-683 message.

Discussing now more specifically the handling of non-IP management protocols using IP based protocols, it is noted that current IP-based management protocols do not support backwards compatibility with a wide range of non-IP protocols. However, an integrated framework requires handling of non-IP protocols as well as IP protocols.

In accordance with an aspect of this invention, non-IP OTA protocols may be handled using an end-to-end IP protocol that uses XML for message and content representation. In an XML message, the non-IP protocol content is identified using a 'Meta' element of XML.

An embodiment of a method in accordance with this invention is shown in FIG. 3, where the Meta element describes the content type as 'non-IP protocol name'. For example, if the XML protocol used is one based on SyncML, and the non-IP protocol is IS-683, the content type may be expressed as 'syncml-dm:cdma-is683'. For a proprietary protocol, such as one known as, but not limited to, the protocol: Nokia-Ericsson OTA (see for example: http://www.forum.nokis.com/main/1,6566,1__47__50,00.html), it may be 'syncml-dm: nokia-ota'.

The process shown in FIG. 3, which may also be viewed as a logic flow diagram, is as follows.

Step A. An IP-based server 24 intercepts a non-IP protocol message, such as an IS-683 Request Message, and encapsulates the non-IP protocol message in an XML message using a 'Meta' element as described above.

Step B. The XML message having the encapsulated non-IP message is sent as a DM message to the DM client 10 via the wireless network 22.

Step C. The XML-capable DM client 10 receives the DM message and identifies the Meta type as a non-IP message content and extracts the Meta content. The content encoding may be specified in the 'Meta' element using a format element.

Step D. The XML-capable DM client 10 invokes a non-IP client 20 in the MS 1 and passes the Meta content to the non-IP client 20 in the non-IP protocol format. It should be noted that in a typical case the MS 1 may contain multiple ones of the non-IP clients 20, and in this case the DM client 10 will determine the identity of the destination non-IP client 20 from the received message and route the Meta data to the correct destination non-IP client. Note also that there may also typically be multiple non-IP network entities 26 that send messages (IS-683 and other types of messages) that are intercepted and processed by IP-based server 24, as described above.

Step E. The non-IP client 20 processes the message containing the Meta content and may send a response. The response sequence then follows the same sequence as in Steps A, B, C and D. That is, at Step F the DM client 10 encapsulates the non-IP response in a XML message using the 'Meta' element as described above. In Step G the DM message is sent to the IP-based server 24, which extracts the Meta content (Step H) and formats and sends a suitable IS-683 response message back to the non-IP network entity 26 (Step I).

In Step C above, and when using SyncML DM for XML representation, the non-IP client 20 can be invoked by specifying an 'Exec' command in the XML message and specifying the target of the Exec command as a node in the management tree for the non-IP protocol.

If the non-IP protocol is 3GPP2 IS-683, the node name may specify IS-683. For example the Uniform Resource Indicator (URI) of the node may be './root/ . . . cdma/is-683'.

Figure 4:
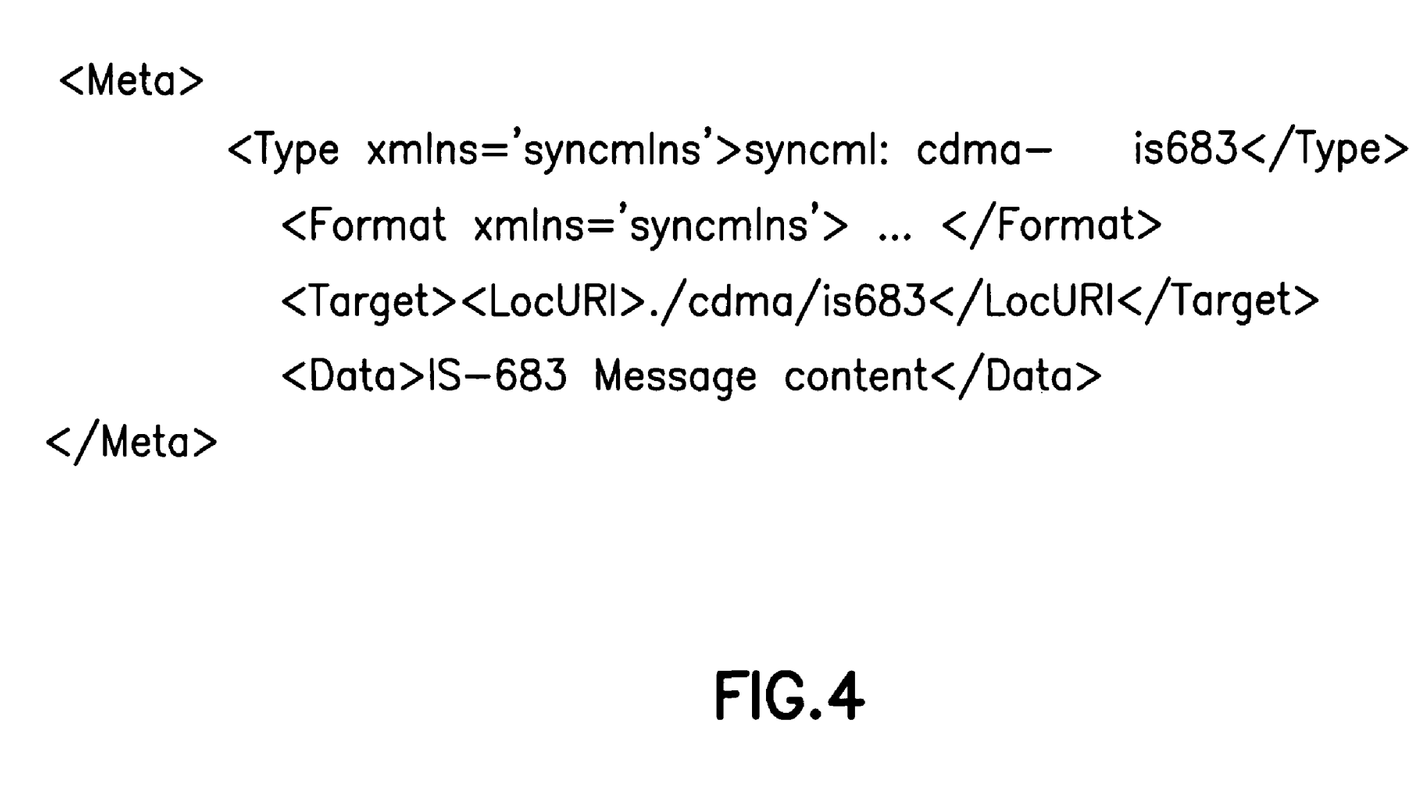
FIG. 4 shows a representation of an end-to-end message format in accordance with the example of FIG. 3.

FIG. 4 is a representation of an exemplary end-to-end message in accordance with the method and system described above.

The various method steps of FIG. 3 can be implemented by suitably programmable data processors located at the nodes of interest in FIG. 3, such as in the MS 1, the IP-based server 24 and the DM client 20.

It can be realized that in embodiments of this invention a message received from the non-IP entity 26 can comprises an IS-683 message, and can include different versions of the IS-683 protocol.

It can be realized that in embodiments of this invention the XML message may include additional information for the processing of Meta content, such as a URI and/or "commands", such as one or more commands to invoke a process in the receiver of the XML message to handle the Meta content, where the Meta data may be base 64 (b64) encoded, or encoded in another format, as specified by a 'Format' element.

It can also be realized that in embodiments of this invention the message received from the non-IP entity 26 can comprise, as an example, a Nokia-Ericsson OTA message (see above).

Further, the XML message may comprise a SyncML DM, or OMA DM message, and the XML protocol may comprise a 3GPP2 IOTA-DM message.

It can be appreciated that the use of the embodiments of this invention can provide significant cost savings through the re-use of software components. For each network there are typically thousands of devices, and instead of re-writing the code for existing functions, developers may instead focus on advanced services and functions, and the carriers may then provision these advanced functions and services to the mobile users using a common integrated provisioning mechanism, as described herein.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent message formats, content representations and the like may be attempted by those skilled in the art.

However, all such and similar modifications of the teachings of this invention will still fall within the scope of the embodiments of this invention.

Furthermore, some of the features of the preferred embodiments of this invention may be used to advantage without the corresponding use of other features. As such, the foregoing description should be considered as merely illustrative of the principles, teachings and embodiments of this invention, and not in limitation thereof.

What is claimed is:

1. A method comprising:
   determining, by a processor, a received message is a non-internet protocol (non-IP) message, that includes non-internet protocol content specifying device management information;
   generating an internet protocol based over-the-air markup language message that includes a meta element and an encapsulation of the non-IP content, wherein the meta element includes a content type field indicating inclusion of the non-IP content; and
   causing, at least in part, transmission of the internet protocol based over-the-air markup language message using an end-to-end internet protocol.

2. A method of claim 1, wherein the non-IP message comprises an IS-683 message.

3. A method of claim 1, wherein the meta element further includes information for processing of the non-IP content, the information comprises at least one of a uniform resource identifier and one or more commands, wherein at least one command of the one or more commands is configured to invoke a process in a receiver of the internet protocol based over-the-air markup language message to handle the non-IP content.

4. A method of claim 1, wherein the non-IP content of the meta element is encoded by a format specified by a format field of the meta element.

5. A method of claim 4, wherein the format is base 64 (b64) encoding.

6. A method of claim 1, wherein the internet protocol based over-the-air markup language message comprises a Synchronization Markup Language device management message.

7. A method of claim 1, wherein the internet protocol based over-the-air markup language message comprises an Open Mobile Alliance™ Device Management message.

8. A method of claim 1, wherein the internet protocol based over-the-air markup language message comprises a 3GPP2 Internet Protocol based Over-the-Air Device Management (IOTA-DM) message.

9. A method of claim 1, wherein the method provides a unified way of managing mobile services over-the-air.

10. An apparatus comprising:
    at least one processor; and
    at least one memory including computer program instructions,
    the at least one memory and the computer program instructions configured to, with the at least one processor, cause the apparatus to perform at least the following,
    determine that a received message is a non- internet protocol (non-IP) message that contains non-internet protocol content specifying device management information;
    generate an internet protocol based over-the-air markup language message that includes a meta element and an encapsulation of the non-IP content, wherein the meta element includes a content field indicating inclusion of the non-IP content; and
    cause, at least in part, transmission of the internet protocol based over-the-air markup language message using an end-to-end internet protocol.

11. An apparatus of claim 10, wherein the non-IP message comprises an IS-683 protocol message.

12. An apparatus of claim 10, wherein the meta element comprises information related to processing of the non-IP content.

13. An apparatus of claim 12, wherein the information comprises a uniform resource identifier.

14. An apparatus of claim 12, wherein the information comprises at least one command configured to invoke a process in a receiver of the internet protocol based over-the-air markup language message to handle the non-IP content.

15. An apparatus of claim 10, wherein where the non-IP content is base 64 (b64) encoded.

16. An apparatus of claim 10, wherein the non-IP content of the meta element is encoded by a format specified by a format field of the meta element.

17. An apparatus of claim 10, wherein the internet protocol based over-the-air markup language message comprises a Synchronization Markup Language (SyncML) device management message.

18. An apparatus of claim 10, wherein the internet protocol based over-the-air markup language message comprises an Open Mobile Alliance™ Device Management message.

19. An apparatus of claim 10, wherein the internet protocol based over-the-air markup language protocol message comprises a 3GPP2 Internet Protocol based Over-the-Air Device Management message.

20. An apparatus, comprising:
    at least one processor; and
    at least one memory including computer program instructions,
    the at least one memory and the computer program instructions configured to, with the at least one processor, cause the apparatus to perform at least the following,
    determine that a received message is an internet protocol based over-the-air markup language message sent using an end-to-end internet protocol, wherein the internet protocol based over-the-air markup language message includes a meta element and an encapsulation of a non-internet protocol (non-IP) content specifying device management information, wherein the meta element includes a content type field indicating inclusion of the non-IP content; and extract the non-internet protocol content from the meta element based, at least in part, on the content type field of the meta element.

21. An apparatus of claim 20, wherein the apparatus is further caused, at least in part, to:

cause, at least in part, transmission of the extracted non-internet protocol content to a non-internet protocol client; and receive a non-internet protocol content response message from the non-internet protocol client.

22. An apparatus of claim 21, wherein the apparatus is further caused, at least in part, to:

generate another internet protocol based over-the-air markup language message based, at least in part, on the non-internet protocol content response message.

23. An apparatus of claim 20, wherein the non-internet protocol content comprises an IS-683 protocol message content.

24. An apparatus of claim 20, wherein the meta element further comprises information related to processing of the non-IP content.

25. An apparatus of claim 24, wherein the information comprises a uniform resource identifier.

26. An apparatus of claim 24, wherein the information comprises at least one command to invoke a process to handle the non-IP content.

27. An apparatus of claim 20, wherein the non-IP content is base 64 (b64) encoded.

28. An apparatus of claim 20, wherein the non-IP content of the meta element is encoded by a format specified by a format field of the meta element.

29. An apparatus of claim 20, wherein the internet protocol based over-the-air markup language message comprises a Synchronization Markup Language device management (SyncML) message.

30. An apparatus of claim 20, wherein the internet protocol based over-the-air markup language message comprises an Open Mobile Alliance™ Device Management (OMA DM) message.

31. An apparatus of claim 20, wherein the internet protocol based over-the-air markup language protocol message comprises a 3GPP2 Internet Protocol based Over-the-Air Device Management (IOTA DM) message.

32. A non-transitory computer readable storage medium carrying one or more sequences of one or more instructions which, when executed by one or more processors, cause an apparatus to at least perform the following steps:

determining that a received message is a non-internet protocol (non-IP) message that contains non-internet protocol content specifying device management information;

generating an internet protocol based over-the-air markup language message that includes a meta element and an encapsulation of the non-IP content, wherein the meta element includes a content type field indicating inclusion of the non-IP content; and causing, at least in part, transmission of the internet protocol based over-the-air markup language message using an end-to-end internet protocol.

33. A non-transitory computer readable storage medium carrying one or more sequences of one or more instructions which, when executed by one or more processors, cause an apparatus to at least perform the following steps:

determining that a received message is an internet protocol based over-the-air markup language message sent using an end-to-end internet protocol, wherein the internet protocol based over-the-air markup language message includes a meta element and an encapsulation of a non-internet protocol (non-IP) content specifying device management information, wherein the meta element includes a content type field indicating inclusion of the non-internet protocol content; and extracting the non-internet protocol content from the message based, at least in part, on the content type field of the meta element.

34. A non-transitory computer readable storage medium of claim 33, wherein the apparatus caused, at least in part, to further perform:

causing, at least in part, transmission of the extracted non-internet protocol content to a non-internet protocol client; and receiving a non-internet protocol content response message from the non-internet protocol client.

35. A non-transitory computer readable storage medium of claim 34, wherein the apparatus caused, at least in part, to further perform:

generating another internet protocol based over-the-air markup language message based, at least in part, on the non-internet protocol content response message.

36. An apparatus comprising:

receiving means configured to receive a message;

data processing means configured to determine that the received message is a non-internet protocol (non-IP) message that contains non-internet protocol content specifying device management instructions and to generate an internet protocol based over-the-air markup language message that includes a meta element and an encapsulation of the non-IP content, wherein the meta element includes a content type field indicating inclusion of the non-internet protocol content; and transmitting means configured to transmit the internet protocol based over-the-air markup language message using an end-to-end internet protocol.

37. An apparatus of claim 36, wherein the non-internet protocol message comprises an IS-683 protocol message.

38. An apparatus of claim 36, wherein the meta element further comprises information related to processing of the non-internet protocol content.

39. An apparatus of claim 38, wherein the information comprises at least one of a uniform resource identifier and at least one command to invoke a process in a receiver of the internet protocol based over-the-air markup language message to handle the non-internet protocol content.

40. A method comprising:

determining, by a processor, that a received message is an internet protocol based over-the-air markup language message sent using an end-to-end internet protocol, wherein the internet protocol based over-the-air markup language message includes a meta element and an encapsulation of a non-internet protocol content specifying device management information, wherein the meta element includes a content type field indicating inclusion of the non-internet protocol content; and extracting the non-internet protocol content from the meta element based, at least in part, on the content type of the meta element.

41. A method of claim 40, further comprising:

causing, at least in part, transmission of the extracted non-internet protocol content; and receiving a non-internet protocol content response message.

42. A method of claim 41, further comprising:

generating another internet protocol based over-the-air markup language message based, at least in part, on the non-internet protocol content response message.

43. An apparatus comprising:

at least one processor; and at least one memory including computer program instructions, the at least one memory and the computer program instructions configured to, with the at least one processor, cause the apparatus to perform at least the following,     determine that a received message sent using an end-to-end internet protocol is an internet protocol based over-the-air markup language message that includes a meta element, wherein the meta element includes a content type field;

determine based, at least in part, on the content type field that the message includes a non-internet protocol (non-IP) content specifying device management information;

extract the non-IP content from the message based, at least in part, on the content type field; and     cause, at least in part, transmission of the extracted non-IP content.

44. An apparatus of claim 43, wherein the apparatus is further caused, at least in part, to:

receive a non-internet protocol response in response to the transmitted extracted non-IP content.

45. An apparatus of claim 44, wherein the apparatus is further caused, at least in part, to:

generate another internet protocol based over-the-air markup language message based, at least in part, on the non-internet protocol response.

46. An apparatus of claim 43, wherein the non-internet protocol content comprises an IS-683 protocol message content.

47. A method comprising:

receiving a non-internet protocol (non-IP) content;

generating, by a processor, an internet protocol based over-the-air markup language message that includes a meta element and an encapsulation of the non-IP content, wherein the meta element includes a content type field indicating inclusion of the non-IP content; and causing, at least in part, transmission of the internet protocol based over-the-air markup language message using an end-to-end internet protocol.

48. A method of claim 47, wherein the internet protocol based over-the-air markup language message is an Internet Protocol based Over-the-Air Device Management (IOTA DM) message.

49. A method comprising:

determining, by a processor, that the received message is an internet protocol based over-the-air markup language message that includes a meta element a non-internet protocol (non-IP) content specifying device management information, wherein the meta element includes a content type field;

determining based, at least in part, on the content type field that the message includes the non-internet protocol (non-IP) content specifying device management information; and extracting the non-internet protocol content from the message.

50. A method of claim 49, further comprising:

invoking a non-internet protocol client; and passing the extracted non-internet protocol (non-IP) content to the non-internet protocol client.

51. A method of claim 50, further comprising:

receiving a non-internet protocol content response;

generating another internet protocol based over-the-air markup language message based, at least in part, on the non-internet protocol content response; and causing, at least in part, transmission of the another internet protocol based over-the-air markup language message.

\* \* \* \* \*